United States Patent [19]

Eastman

[11] 3,884,221

[45] *May 20, 1975

[54] METHOD FOR THE CONSTRUCTION AND DIAGNOSIS OF THREE DIMENSIONAL ELECTROCARDIOGRAMS

[76] Inventor: George Eastman, 102 Old Clairton Rd., Pittsburgh, Pa. 15236

[ * ] Notice: The portion of the term of this patent subsequent to Aug. 20, 1990, has been disclaimed.

[22] Filed: June 10, 1969

[21] Appl. No.: 831,954

[52] U.S. Cl. .......... 128/2.06 V

[51] Int. Cl. .......... A61b 5/04

[58] Field of Search ..... 128/2.06 A, 2.06 G, 2.06 R, 128/2.06 V

[56] References Cited

UNITED STATES PATENTS

| | | | |
|---|---|---|---|
| 3,374,461 | 3/1968 | Anderholm et al. | 128/2.06 A |
| 3,554,187 | 1/1971 | Glassner et al. | 128/2.06 A |
| 3,658,055 | 4/1972 | Abe et al. | 128/2.06 A |

OTHER PUBLICATIONS

Silcocks et al. "Proceedings of the Annual Biomedical Sciences Instrumentation Symposium on Imagery in Medicine," May, 1969, pp. 37–43.

Rogers et al. "IEEE Transactions on Biomedical Engineering" U. BME. 15, No. 4, October 1968, pp. 312–323.

*Primary Examiner*—William E. Kamm
*Attorney, Agent, or Firm*—Lawrence G. Zurawsky

[57] ABSTRACT

This disclosure relates to a method for extracting significant data values, analogous temporarily and electrically to the physiologic myocardial action potential which accompanies each cardiac contraction, from conventionally recorded electrocardiograms.

This disclosure relates further to a method and programs for the determination, from the scalar data of the above voltage values, of three dimensional vector determinant values which alternatively permit either the construction of a physical model of each considered electrocardiographic deflection set, or, by sequential comparison of such determinants with previously determined normal and abnormal determinant series of vector set points, permits the interpretation of conventional electrocardiograms in digital computers.

10 Claims, 4 Drawing Figures

| | P | Q | R | S | R' | S' | R'' | J | T |
|---|---|---|---|---|---|---|---|---|---|
| I | | | | | | | | | |
| $aV_f$ | | | | | | | | | |
| $V_1$ or $V_2$ | | | | | | | | | |

INVENTOR.
GEORGE EASTMAN
BY
Lawrence G. Zurawsky
ATTORNEY.

| TIME VALUES | COMPLEX | | | | | |
|---|---|---|---|---|---|---|
| | 1 | 2 | 3 | 4 | 5 | 6 |
| $P_i$ | | | | | | |
| $P_t$ | | | | | | |
| $Q_i$ or $R_i$ | | | | | | |
| $R_t$ or $S_t$, etc. | | | | | | |
| $T_i$ | | | | | | |
| $T_t$ | | | | | | |

INVENTOR.
GEORGE EASTMAN
BY
Lawrence G. Zurawsky
ATTORNEY.

METHOD FOR THE CONSTRUCTION AND DIAGNOSIS OF THREE DIMENSIONAL ELECTROCARDIOGRAMS

BACKGROUND OF THE INVENTION

1. Field of the Invention

This invention relates to a method and programs for the interpretation of, and physiologic and clinical diagnosis of the clinical electrocardiogram, hereinafter referred to for brevity as the "ECG".

2. Description of the Prior Art

Heretofore, two methods, one commonly used and one of major research interest (but of limited widespread clinical usefulness) have been employed. Those are: (a) interpretation by human observation, memory recall and analysis of the individual tracing set (the ECG) by specially trained and experienced physicians known as electrocardiographers, and (b) employment of more or less complete logic pathways and diagrams for classification, of numerical data derived from electrocardiographic leads of their electrical analogue voltages, by a digital computer into diagnostic categories of clinical interest. Those two categories of interpretation will hereinafter be referred to as human and computer diagnostic methods, respectively. All human methods and some computer methods begin with the recording of scalar cardiac action potential derivative voltages from electrodes temporarily fastened to the patient's upper and lower extremities and subsequently to selected point areas across the anterior of the patient's thoracic cage. From these are recorded twelve linear tracings which measure body-surface-point to common ground, or point-to-point instantaneous current flow values. Those values are interpreted, by virtue of their interaction with a high, fixed and internal-to-machine impedance, as potential differences and are so recorded. Those potentials are of the order of 10 microvolts, minimal readable deflections, to a maximum of 10 millivolts, maximum machine obtainable deflection magnitude. The tracings so obtained are by convention called leads and are labeled I, II, III, $aV_r$, $aV_1$, $aV_f$, and $V_1$, $V_2$, $V_3$, $V_4$, $V_5$, and $V_6$. Those 12 leads are by convention, in the absence of interfering skeletal muscle action potentials, assumed to represent projections of the underlying myocardial action potential on the body surface. The ultimate generating source for the observed potentials is the muscle of the heart chambers in the process of orderly and regular intermittent contraction, to wit the right and left atria and the right and left ventricles. The myocardial potential is, in fact, the sum of the electrical forces released from the various portions of the myocardium to the surface of the body as each cell thereof undergoes successive depolarization and repolarization.

The summated effect of the electrical force generated by each cell is held to be equivalent to that which would be generated by single electrical dipole of continuously variable magnitude from zero to a given maximum and of continuously variable three dimensional positions throughout any combination of the available 360° of azimuth and 360° of elevation on the surface of a conventional sphere of spherical trigonometry having its center located at the center of the conventional xyz, Cartesian, three-dimensional, coordinate system and having its three right angle crossed diameters coincident with those axes.

Each lead is represented as summing the effects of the electrical forces generated within a right circular conicoid figure of arbitrary apex angle, with the apex located at a given spherical surface point, with the major axis of the conicoid figure coincident with the spherical diameter projected through that point and with the base of the conicoid figure being the swept-out, opposite spherical surface. In that system, the surface potential difference, $V_s$, inversely can be assured to vary directly as a function of $V_i$ and inversely as a function of the square of $d$ where $V_i$ is the internal potential difference of the generating potential difference and d is the difference measured from the hypothetical generating dipole to the recording electrode.

Each lead tracing consists of the recorded potential differences on its vertical axis, and lapsed time on its horizontal axis, of a successive series of cardiac contractions. Examination of the order, or lack thereof, and the regularity in time, or lack thereof, of the succession of a series of deflections within one or more leads up to a total of the twelve available leads enables the reading electrocardiographer by observation and measurement to determine whether the entire heart and/or component portions are contracting in a normal, expected and orderly fashion or to determine the contrary.

Detection of an irregularity or a series of irregularities then leads to comparison of their characteristics with the characteristics previously observed in other tracings by this particular observer, or recorded in the literature of the field, or both, thus permitting in nearly every instance the classification of the type or rhythm disturbance (hereinafter referred to as "arrhythmia") into definite nosological and/or clinical diagnostic categories. Examination of a combination of specific temporal interrelationships and associated voltage values of given parts of the deflections enables the electrocardiographer to determine the normality or abnormality of impulse conduction throughout the successively depolarized and repolarized portions of the myocardium; and to make similar deductions to those described under arrythmias above, but in this portion of his analysis, to apply criteria for the classification of the nature, location, type and severity of the observed conduction defect.

Examination and measurement of voltage values, particularly, and temporal values to a much lesser extent than in the arrhythmia and conduction defect sections described above, enables the electrocardiographer to make deductions about the functional status and/or integrity of the heart muscle. This portion of the diagnostic procedure will hereinafter be referred to as the "myocardial", or "heart muscle", or "muscle" diagnosis.

In the heart muscle diagnosis portion, one can detect discreet random defects as in myocardial infarctions; specific chamber dilatation, hypertrophy and/or malfunction as in valvular heart disease, congenital or acquired, and also as in early hypertensive heart disease; and/or generalized muscle hypertrophy fibrosis and/or dilatation as in late hypertensive heart disease, active rheumatic heart disease and the various cardiomyopathies. The above list of etiologies of myocardial disease detectable by electrocardiography is a representative listing of the commonly diagnosed lesions, but does not exclude from ECG diagnoses various other rarer lesions.

The widely practiced human interpretations of electrocardiograms can be seen as both a science and as an art and at least a portion of its inductive and deductive reasoning is carried out by intuitive or heuristic methods which do not permit totally accurate evaluation and/or individual performance comparisons.

Even though the actual myocardial event is a three dimensional one with continuously variable vectors having both magnitude and free spherical surface movement available, instrumentation has reduced the data supplied to the human ECG interpretor to a series of scalar (one dimensional) tracings of variable scanning directions and variable surface representation of underlying changing voltage events. In an imperfect and relatively naive sense, it is possible for the ECG interpreter to catch a dim view of what must have been the actually occurring three dimensional event, but given the complexity of the question involved and the consequent requirement for numerical data processing, it is beyond the capability of human mind to analyze, characterize, and process the material necessary. In essence, the need is for an apparatus and method to run back up the scale of complexity from one dimensional to two dimensional and finally to three dimensional spatial reasoning; that same scale down which data was degraded for necessary instrumental reasons in the recording of the electrocardiogram.

Human electrocardiographers rely for their interpretation only minimally on vectorcardiographic reasoning (and that amount as seen above only in an inaccurate and imperfect way). Instead, their principal methodology is by comparisons, lead by lead, portions of one lead as compared to similar portions of other leads, and different portions of the same lead all intercompared. This technic is known as pattern reading and will be so described hereinafter. It relies on mental and possibly physical storage of previous ECGs recorded from other patients, and mental or physical retrieval of the significant portions of those tracings for comparison purposes.

The necessity for long training and experience for carrying out human interpretation is obvious. Other factors limiting the accuracy of human interpretation include the day to day variability of the performance of the individuals doing this task, the necessity to screen superfluous input data for contradictory and/or illogical information, and the necessity to accord due and proper weight to the manifestations of several concurrently present disease processes observed in a single tracing.

The above mentioned limitations, coupled with the non-availability of electrocardiographers in many small community hospitals, has led to a number of projects published in the medical literature attempting to so handle data initially generated by the myocardial action potential and variously recorded that this data could be processed and "diagnosed" by digital computer methodology. Those various attempts will be discussed under the generic form of computer ECG diagnosis.

One major type of computer analysis has as its theoretical base a three dimensional representation of the myocardial action potential in vector form. This method is generally labeled as the "orthogonal" method. For the various biophysical reasons discussed above, this approach most closely simulates the underlying physiologic event and should hypothetically yield optimum diagnostic results. This probably is true at least in a theoretical sense in that given both extended time and highly expensive apparatus, the method has been demonstrated to function. It requires direct coupling in real time between the patient and the digital computer. This is accomplished by patient electrode pick-ups attached to the torso at other points than those used in conventional electrocardiography, a sensing device which amplifies the several obtained simultaneous analogue voltages, then proceeds through the steps of integration or differentiation and combination, followed by an analogue to digital converter and finally by digital computer analysis. The time requirements for this system limit markedly the number of interpretations obtainable per computer hour and therefore, per dollar spent. The cost of the interfacing electronic apparatus between the patient and the digital computer exceeds that of the usual clinical electrocardiograph by several fold at least. Both the direct patient-computer connection requirement and the use of non-standard electrode placement sites precludes building an in-computer memory file of data for comparison and diagnostic assessment from any ECGs recorded in conventional rather than idiosyncratic form. Finally, the clinician responsible for patient care desires and deserves an ECG recording which, even though read by a more skilled interpreter in person or by suitable computer instructions still is in such a form as to permit his own assessment of the actual ECG wave forms. This is not available in the "orthogonal system" of computer ECG interpretation discussed immediately above.

There have been published a description of, and a narrative concerning, the use of a computer method of ECG interpretation wherein the pertinent scalar deflection points of a conventional ECG are read into a memory and then point by point comparison of the input data is made with a series of previous scalar tracings diagnosed by human interpretation of both normal and abnormal characteristics. Such a program reduces to mathmetical logic form the thought processes of a human interpreter using the pattern recognition method of interpretation referred to above. Such a method reduces to a minimum the ability required for read-in (technician level only) and allows for averaging by cumulative input into computer memory of tracings interpreted by a group of electrocardiographers, but nevertheless the computer interpretation is still based on the less desirable pattern recognition method of interpretation. That method also perpetuates the redundancy of much of the input data and requires point by point read-in of all 12 lead tracings, a 300 percent increase in point value scanning time as compared to a three lead semi orthogonal read-in lead choice which represent the geometric minimum for construction of a three space figure. That method also requires an amount of tabulation and key punching unacceptable in view of time and cost for application in the average community hospital or physician's office. As actually performed in testing, it required the punching of three, 80-line data processing cards per case and then, after accumulation of a sufficient number to make the procedure worthwhile, transportation of the cards from the cardiology department of the hospital to the computer site for processing. Requirements for timely interpretation cannot be expeditiously met in such a fashion.

Conventional methods of ECG interpretation and diagnosis by a human interpreter are amply described in multiple texts and journals extant in the medical sciences. Numerous articles have also appeared in the literature during the development period of the orthogonal type of computer ECG interpretation described above. The article describing the attempted computerization of diagnosis of standard conventional electrocardiograms is described in "Computer Interpretation of Electrocardiograms", by Staples, Gustafson, Balm and Tate, *American Heart Journal* v. 72, July–December, 1966, pp. 351–358. Technics for the interpretive treatment of the cardiac cycle in the three dimensional phenomenon are explained in such works as SPATIAL VECTOR ELECTROCARDIOGRAPHY, Grant, R. P. and Estes, E. Jr., New York, Blackiston Company, 1951; in a previous medical article by this inventor which article is entitled "A New Method of Deriving a Vectorcardiogram From the Routine Clinical Electorcardiographic Leads", *Journal of the American Geriatrics Society*, by Eastman, G., Volume 8, page 708, 1960; and in other texts and journal articles readily available by consulting the index catalogue of the Armed Forces Medical Library or similar indices of the medical and physiologic literature.

SUMMARY OF THE INVENTION

According to the method of this invention a conventional ECG tracing is obtained from either the immediate recording from a patient using any standard electrocardiograph or it may be obtained by later reference to a tracing similarly recorded (and filed) at any past time.

The tracing is measured according to the method of the invention, recording values along the horizontal (time) axis for a succession of deflectious contained in lead I and along the vertical (voltage) axis using deflections found in leads I, $aV_f$ and $V$, or $V_2$.

In the first case, the points measured include the initiation and termination of the constituent major deflection entities, i.e. the P wave, the QRS complex, the T wave and rarely any successor waves. In the second case there is measured the instantaneous voltage maxima attained (either positive or negative) for each of the deflection entities, i.e. the P, Q, R, S, R′, S′, R″ and J and T, with the absence of any one recorded as a null (zero) value.

This data is then entered by standard input technics into a digital computer which first verifies by comparison the sign correctness and "physiologic possibility" of the input data.

Then by use of a master program directing the sequential data manipulation according to the method of this invention, the time and voltage parameters of the three dimensional electrical phenomena which ab initio generated the electrocardiogram under examination are approximated.

Part of the stored program comprises a body of previously calculated three dimensional data points and temporal points obtained from numerous normal ECGs for cardiac tracings exhibiting no physiological abnormalities. In addition to the stored comparative data for normal ECG tracings, the program provides comparative data for each type of cardiac abnormality that might be encountered and a statistical comparison of the three dimensional and temporal data for each type of cardiac abnormality with similar data exhibited by the normal ECG. According to the method of this invention, the spatial vector and temporal data for the ECG to be analyzed are compared with the stored data for the normal ECGs and for abnormal ECGs to determine the likelihood of existence of a cardiac abnormality, what the nature of the probable abnormality is, and the statistical probability of the existence of each type of abnormality considered.

After comparison and diagnosis of the ECG data, the program is adapted to supply directly to the sender, an output indicating the probability of normality of the submitted electrocardiogram and the concomitant probability of the existence of any specific cardiac abnormality.

The method of this invention provides a reliable, rapid and inexpensive means for obtaining interpretation and diagnosis of ECGs which permits the wide spread use, by virtually all hospitals and medical practitioners, wherever geographically situated, of computerized interpretation of ECGs and diagnoses therefrom. The method of this invention reduces substantially the amount of data needed for interpretation and diagnosis of ECGs and provides a reliable and consistent means of analysing ECGs which circumvents the possibility of variation and error inherent in human interpretation of such data.

It is an object of this invention to provide a method enabling the interpretation of ECGs and the provision of cognitive assistance in the medical diagnosis therefrom by digital computer installations at a cost acceptable to substantially all hospitals and medical practitioners.

It is a further object of this invention to provide a method for interpretation of ECGs based upon substantially less basic data from the ECG tracing than was heretofore required.

It is still another object of this invention to provide a method enabling interpretation of ECG data as a three dimensional phenomenon while markedly lessening from such interpretation and diagnosis the possibility of human variation and error.

DESCRIPTION OF THE PREFERRED EMBODIMENTS

Figures 1, 2:
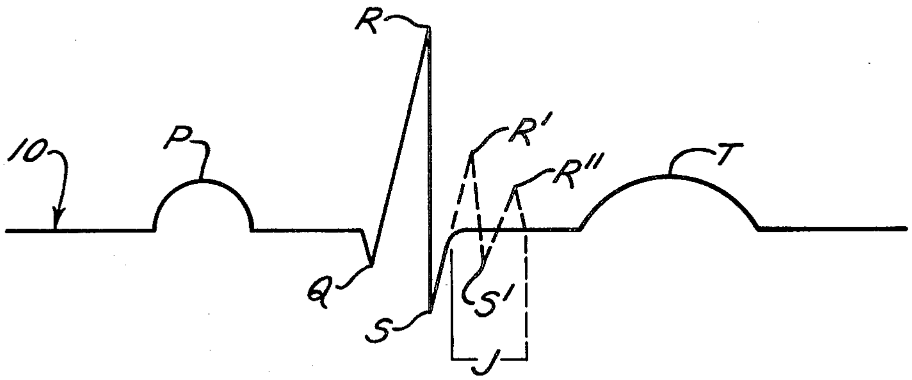
FIG. 1 is a composite illustration of the various ECG wave forms that might appear in the conventional tracing.
FIG. 2 is an illustration of the data form employed in recording the the data from FIG. 1 and serves as a starting point for the data processing described in the method described below.

According to the method of this invention a conventional ECG tracing is obtained using any of the available clinical electrocardiographs, recorded at the normal speed of 50 millimeters per second and standardized at the normal value of 10 millimeters deflection equivalent to the standard reference 1 millivolt voltage.

Either from the ECG in its unmounted or strip form, or after mounting of the various lead tracings, on any one of the available standard mounting cards, or on a copy of a so-mounted ECG made from the original by any of the standard photocopy processes, values are then measured by apparatus not illustrated which provides voltage deflection values and time values.

The rhythm and conduction diagnosis portion of the procedure are obtained from lead I solely and a succession of a minimum of six and a maximum of fiteen deflections are measured with reference to the initiation and termination of the normally found P waves, the time values of the initiation and completion of the set of deflections comprising the QRS complex and the initiation and completion of the T wave.

In the muscle diagnostic portion of the program representative single deflections are measured in three leads, namely lead I, lead $aV_f$, and either lead $V_1$ or $V_2$. Those measurements are made using the vertical scale and in essence constitute measurement of the maximum departure from the base line, either in an upward or downward direction, of the following constituents of each complex considered: the P wave, the constituent parts of the QRS deflection, namely the Q wave, the R wave, the S wave, the J or QRST segment junction, and also, if present, the additional waves labeled R′, the S′ and the R″, and finally the height of the concluding wave of the complex, the T wave.

The data obtained in seconds or milliseconds and millivolts or microvolts is entered by the reading technician into a form containing two data tables as disclosed herein and is then transmitted to a centrally located computer which proceeds through the following steps:

a. In accordance with the process and program herein disclosed, the time values are scanned and the degree of regularity or irregularity of the sequence of similar portions of each deflection and different portions within the same deflection are compared to standards prerecorded in the computer memory bank and by means of such comparisons a decision is reached as to whether the succession of tracings occur regularly, regularly irregular or irregularly irregular. If either of the two later circumstances is obtained, the type of irregularity is further compared with previous stored standards and a decision is reached as to which of a variety of print out diagnoses will eventually be supplied for the interpretation of this particular tracing at the completion of the remaining portion of the program.

b. The vertically inscribed data for representative complexes as described above is subjected to a process of appropriate combinations, extractions and recombinations of data of the several variables presented as input to determine the magnitude and phase angles of each of a series of selected two dimensional or planar vectors representative of the motion of the cardiac action current in a particular plane. Then two orthogonal planar vector series are further combined to yield a set of successive vectors of from eight to 10 members of each series, which in numerical form, or in the form of a three dimensional wire or rod model, can express a reasonable clinical approximation to the magnitude and direction of the underlying generating dipole myocardial action current.

It should be emphasized that the process of determining the vector representations of the myocardial action current from the particular available data base is unique to this method. Having as it does a starting point of a commonly produced and commonly generated tracing, it has far wider applicability than any available or conventional methods.

Additionally, from the succession of vectors described in the paragraphs above, the method herein disclosed provides for the determination of discriminate vector values which do not directly exist in electrically analogue form in the myocardial current but which nevertheless have significant diagnostic capabilities. Those values include approximations of quantities referred to herein as the ventricular gradient, three Eigenvectors referred to herein as Eigenvectors A, B, and C, and the polar vector.

Even granting a capability on the part of a human electrocardiographer to appreciate, but not quantitate, the existence and approximate direction of the constituent vector succession of the myocardial action current, the secondarily derived vector magnitudes are completely beyond any unaided human capability of such comprehensive accurate and reliable reconstruction or observation of the original tracing and require the use of this invention's method and the process of vector construction followed by appropriate vector combinations for their successful achievement.

c. Finally attention is directed to specific circumstances in which prolongation of the time interval between the onset of the P wave and the onset of the QRS complex, or between the onset and termination of the QRS complex, or either prolongation or undue shortening exists in the time span between the beginning of the QRS complex and the ending of the T wave.

If an observation of prolongation or shortening of any of those time intervals is observed, a tentative diagnosis of the existence of a conduction defect can be made. Reference is then required to the original time measurement program specified under (a) above and the "myocardial program" described under (b) for the determination of the nature of the conduction defect and its location.

Generally prolongation of the time interval between the onset of the P wave and the beginning of the QRS complex can be assumed to represent delay in transmission of the cardiac impulse from the atria to the ventricles and its quantitation yields a finding of first or second degree A-V block and further investigation is required as to whether the degree of prolongation is fixed or variable for the separation out of the Wenkebach phenomenon. In the event that the degree of the A-V block exceeds a given value, a diagnosis of third degree block is made and then reference is had to the vector characteristics of the QRS complex as determined in the method described in (b) above for the determination of the site of onset and excitation of the ventricular complexes observed.

The shortening of the interval from the beginning of the P wave to the beginning of the QRS wave is read by the time detection portion of the program as representative of the Wolf-Parkinson-White syndrome and as such again requires reference to the myocardial portion of the program to determine whether there is present or absent a classic delta pattern also diagnostic of this syndrome.

In the matter of prolongation of the QRS interval, a diagnosis of bundle branch block is tentatively entertained and reference to the myocardial program ascertains whether vector loop changes characteristic of either right or left disease of the bundle branch exists. Similarly, a finding of a successive vector loop pattern suggestive of bundle branch block during the myocardial portion of the program leads to reference to the time portion to determine whether prolongation of the QRS interval exists and, when both are found to coexist, an appropriate diagnosis of conduction defect is made.

In the arrhythmia diagnostic section labeled (a) above, the finding of a regular irregularity produces additional instructions to the person entering data, requesting entry of the QRS parameters of the cardiac contraction occurring with regular irregularity and at a time interval earlier than one might anticipate its occurrence in a regular sequence. This contraction is compared with those of the right and left bundle branch block types and, because of clinical circumstances, it labeled not as right and left bundle branch blocks, but as ventricular premature beats occurring with an exciting focus in either the right or left ventricle, respectively.

Alterations in either direction of the time interval from the beginning of the QRS complex to the completion of the T wave are interpreted along with derived information concerning the T vector as determined in the basic myocardial program (b) above. In this portion of the program, comparison of the characteristics of the T wave with the prolongation or shortening of the interval enables diagnoses to be made of abnormalities in electrolyte concentration in the myocardial extra and intracellular fluids.

When the above programs (a), (b) and (c) are completed, information in numerical form generated by each of the programs successively, and by the interactions between them as described in the paragraphs immediately above, is stored and retained in a temporary computer memory bank. Stored in a permanent computer memory bank are the mean values and standard deviations for all of the temporal event measurements, and for the magnitudes and phase angles of the planar vectors and for the magnitudes, azimuths and elevations of the three dimensional vectors and also for the constructed vector quantities; namely, the ventricular gradients and the Eigenvectors. Those mean values are all accompanied by appropriate standard deviations about those means as determined by prior programming into the machine of a large series of both normal and abnormal tracings with appropriate labels so that the nature of each mean standard deviation can be adequately, accurately and promptly established.

The next immediate step in data processing is the direction to the machine to compare each of the series of temporal values and constructed vector values with the normal anticipated values. Then an approximation is made of the difference in terms of standard deviations and fractions thereof from the anticipated normal means. The standard deviation differnce pattern is retained in another section of temporary memory storage and a similar standard deviation difference pattern is established for each of the considered pre-programmed diagnoses.

Those diagnoses in which the standard deviation difference values are appropriately summed, with weighting factors applied to the vectors of greatest discriminate value, are then successively considered as possible diagnoses for an unlimited number of unknown tracings. Any and all tracings which yield a probability value in excess of a $p$ of 0.05 are then subjected to multi-variant regression analysis with differences calculated between the observed temporal and vector values of greatest discriminate capability.

The result of the multi-variant analysis is a probability score expressible in percentage terms of the concordance of the unknown input tracing with the previous established pattern of tracing characteristics as found in the computer's memory storage. This is sent back from the computer to the user in the form of an alphabetic-decimal print-out giving the major diagnoses listed in order of probability and their attached probability estimates. The print-out concludes with the statement that all other diagnoses considered have probabilities of less than 5.0 percent.

The method of this invention for constructing a three dimensional model of the cardiac cycle from the one dimensional data of a conventional ECG tracing is explained in detail below with reference to the accompanying drawings. FIG. 1 depicts a conventional ECG tracing indicated generally by reference numberal 10. The deflections are represented by the upper case letters P through T in accordance with accepted medical convention. The phantom lines representing defelections R', S' and R'' indicate those deflections which might be absent from certain tracings and the junction point, J, is shown as the junction between the end of the QRS segment and the beginning of the T segment.

According to the method of this invention, an ECG is obtained from the patient using the conventional number of 12 leads. In most circumstances in which the method of this invention is used, the data from the 12 leads conventioanlly employed is not required; therefore, in a preferred embodiment of this invention, the data required will be only that obtainable from the leads I, aV and either $V_1$ or $V_2$. In certain special cases involving complicated diagnoses, additional data might be required from the tracings obtained from other leads; however, the great majority of cardiac abnormalities can be diagnosed from the three tracings specified above.

One advantage of the method of this invention is found in the fact that the necessary data can be obtained from the ECG tracings by a clerk or technician who need not be skilled in the medical arts or in the interpretation of ECGs. Using visual inspection or a suitable device, the clerk is able to fill in rapidly the data form depicted in FIG. 2 for each of the leads I, $aV_f$, and either $V_1$ or $V_2$.

Inspection of FIGS. 1 and 2 will show that the data recorded comprises the voltage reading for each of the deflection points P, Q, R, S and T. In FIG. 1, the deflection points R', R'' and S' are indicated by phantom lines because those points, or any one of them, might not be present in a particular ECG tracing. In those circumstances, where R' R'' or S' is absent from the tracing, a zero is recorded in the relevant data block on the table of FIG. 2.

The data recorded in FIG. 2 corresponds to that representing the series of differing peak voltage values attained during one complete cardiac cycle beginning with the inception of the P wave and continuing through to the end of the T wave. As can be seen from inspection of FIG. 3, initiation and termination data points are determined for a plurality of complete cardiac cycles for one lead only and are used in the determination of the cardiac rhythym and conduction properties.

Figures 3, 4:
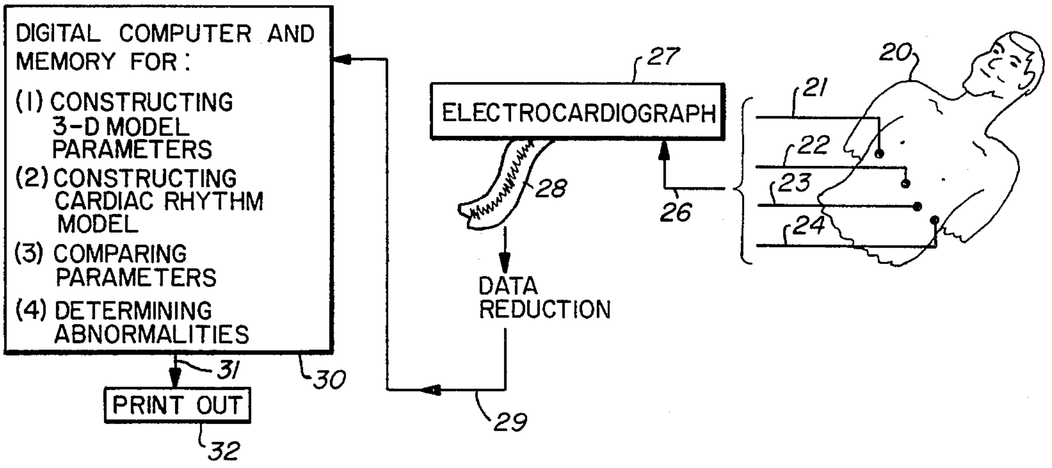
FIG. 3 is an illustration of the data form containing input data for analysis of the temporal parameters contained in the ECG under study.
FIG. 4 is a diagrammatic illustration of a system utilizing the invention.

The data compiled in FIGS. 2 and 3 is thereafter processed by a program which proceeds as follows:

The terms P, Q, R, S, R′, S′, R″, J and T are measured values of FIGS. 2 and 3 and represent algebraic magnitudes. MI, M, MT, $I_1$, $I_2$, $I_3$ and $I_4$ also represent algebraic magnitudes to be determined. The corresponding absolute values of the above quantities are represented by $p$, $q$, $r$, $s$, $r'$, $s'$, $r''$, $j$, $t$, $mi$, $m$, $mt$, $i_1$, $i_2$, $i_3$ and $i_4$, respectively. N represents any quantity P, Q . . . T, MT . . . $I_4$, and $n$ represents any quantity $p$, $q$ . . . $t$, $mi$ . . . $i_4$, in the general case. The three orthogonal ECG leads I, $aV_f$ and $V_1$ (or $V_2$) are designated by $x$, $y$, and $z$, respectively. With those conventions established, the vector models are constructed as follows:

1. P, Q, R, S, R′. . . J, T, $I_1$, MI, $I_2$, M, $I_3$, MT, $I_4$, represent algebraic magnitudes, and $p$, $q$, $r$, $s$, $r'$. . . $j$, $t$, $i_1$, $mi$, $i_2$, $m$, $i_3$, $mt$, $i_4$, their corresponding absolute values, and N and $n$ the general case of Q, R, . . . and $a$, $r$ . . . respectively.

Lower case $x$, $y$, and $z$ are jointly herein designated as both the orthogonal axes of the standard cartesian coordinate system and their related electrocardiographic leads which are lead I, lead $aV_f$, and lead $V_1$ or $V_2$, respectively, with the convention of positivity to the right, upward and anteriorly in each of those leads respectively.

2. Let $x$, $y$, $z$ designate three orthogonal ECG leads as general description or as subscripts.

Now there is determined for the QRS complex a quantity called the mean travel distance, which is in fact one half of the total excursions going away from and toward the base line generated in the course of the QRS complex. This is produced by the addition of one absolute magnitude of each deflection Q, R, S, etc. less one half of the algebraic magnitude of the difference between the termination of the QRS complex and the isopotential base line; that is, J/2.

3. Calculate in turn for leads $x$, $y$ and $z$ as follows:
   $q + r + s + r' + \ldots (-J/2) = mtd$ (mean travel distance)

The mean travel distance is equivalent to the 50th percentile, or second quartile, of the distance and the 25th (first quartile) and 75th (third quartile) percentile are determined by multiplying this derived value by one half and three halves, respectively.

4. Determine $(mtd/2)$ = (mean initial travel distance)

and $3mtd/2)$ = (mean terminal travel distance)

Similarly, for later purposes, the total travel distance is calculated by multiplying the mean travel distance by two.

5. Consider $2n$ as the total travel distance of any N $= n_1$ (travel from base line to peak or nadir) $+ n_2$ (travel returning to base line)

The location of the 25th percentile (first quartile) travel point along the QRS path in terms of both the segment of the wave on which it lies and the value of the voltage at that point is determined in the following fashion. Travel distance is postulated as an initial absolute quantity and then the absolute value of each wave form deflection is subtracted once for the distance away from the base line and a second time for the travel distance returning to the base line. The QRS complex is explored until a given subtraction of this series yields a negative number. This, in geometric fact, means that the 25th percentile or the first quartile has been passed beyond. The final subtraction is identified as either being the first or the second subtraction of that particular wave quantity and therefore the subtraction process has located the first quartile on either the section of the deflection leaving the base line or the reaction of the deflection approaching the base line, respectively. Furthermore, the location of the first quartile point is made on either negative or positive deflection using the convention that the Q wave, if present, is negative, the R is positive, the S is negative, the R′ is positive, the S′ is negative, and the R″ is positive. Therefore, the first two sets of subtractions whether they be integers and tenths, or zeros in the case of an absent Q wave, represent negative deflections, the next two positive, the subsequent two negative, etc. Four conditions are then established for the potential location of this point and, therefore, its voltage value at that point. They are as follows:

a. the point can be located on a deflection whose entire value is negative; i.e., Q, S, S′ and can further be located on the portion of the deflection going away from the base line;
b. the point can be located on a deflection which is negative as above and on a limg returning to the base line;
c. the point can be located on a deflection which is positive in voltage value such as R, R′, or R″ and can be located on a portion of that deflection leaving the base line;
d. the point can be located on a positive deflection as in (c) above but can be located on that portion of the deflection returning to the base line.

The method specifies each of those conditions in turn, specifies the method of identification, and specifies the necessary calculation for converting the numberical value by proceeding retrograde in the subtraction series described in the preceeding paragraph to the last positive value before the result of the successive iterative subtractions became negative and applying the necessary conversion factor which is either acceptance of the value, a multiplication of the value by −1 or by subtraction or addition of the last positive sign from the algebraic magnitude of the deflection on which it, by definition, is located. That is procedure is expressed as:

6. Calculate the sum of the series
   $m\ t\ d/2 - q_1 - q_2 - \ldots - n_1$ or $n_2$ to yield the first negative term.
   Identify the final $n$ as $n_1$ or $n_2 = q_1$ or $q_2$, $r_1$ or $r_2$, . . .
7. If term $n = n_1$ in Sum (6) above then
   $mi = m\ t\ d/2 - q_1 - q_2 \ldots - n_1 + n_1$
   and if $n = q, s, \ldots$
   $-mi$ = MI, and is located on $q_1$, $s_1$, . . .
   or if $n = r, r', \ldots$
   $mi$ = MI and is located on $r$, $r'$, . . .
8. If term $n = n_2$ in Sum (6) above
   and $m\ t\ d/2 - q_1 - \ldots - n_1 = 0$
   and $n = q, r, s, r'$, MI = and is located exactly on Q, R, S, R′
   or if $m\ t\ d/2 - q_1 - \ldots - n_1 = 0\ (>0)$
   and if $n = q, s, \ldots$
   then $N + (m\ t\ d/2 - q_1 \ldots - n_1) = MI$
   and MI is located on $q_2$, $s_2$, . . .
   or if $n = r, r', \ldots$
   $N - (m\ t\ d/2 - q_1 - q_2 - \ldots - n_2) = MI$
   and MI is located on $r_2$, $r'_2$, . . .

Next is described a series of mathematical logic steps in which one proceeds retrograde from both MIT, the algebraic magnitude of the first quartile point, from M, the algebraic magnitude of the mid-travel point, and from MT, the algebraic magnitude of the third quartile point and proceeds until an inflection point or change of direction of the curve exists. One also proceeds antegrade from MT to the end of the sum of the deflections identifying any inflection point which occurs distal to the MT value in the evolution of the curve. This established values for $I_1$, $I_2$, $I_3$ and $I_4$ which are defined as the algebraic magnitudes of the various inflection points of the curve and generally, but not in all instances, agree with the values for Q, R, S, R'.

15. Consider the sequence
$q_1, Q, q_2, r_1, R, r_2, s_1, S, s_2, r'_1, R', r'_2, \ldots$
Locate from steps (7) or (8) MI 16. Beginning with the term on which MI occurs, proceed retrograde to the beginning of the series, discarding $n$ values
$* I_1 = N_{MI} + (N-1) + (N-2) + \ldots$ 17. Beginning with the term on which M lies proceed retrograde to but not including the term on which MI lies, discarding $n$ values
$* I_2 = N_M + (N-1) + (N-2) \ldots + (n_{MI}+1)$ 18. Beginning with the term on which MT lies proceed retrograde to but not including the term on which M lies, discarding $n$ values
$* I_3 = N_{MT} + (N-1) + (N-2) + \ldots + (N_M - 1)$ 19. Beginning with the next term after that on which MT lies and discarding $n$ values
$* I_4 = (N_{MT}+1) + (N+2) + \ldots$ 20. * – All $(N+c)$ are logical terms, not computations and identify N members of series which by definition $(N+1)$ is not equal to N + integer but is simply an identifier of a specific N.

Next the program considers whether in terms of any of three $xyz$ computations which have been performed in accordance with the above program a value for $I_1$, $I_2$, $I_3$ or $I_4$ appears or considers whether no values for $I_1$ or $I_2$ or $I_3$ $I_4$ appear in any of the three $xyz$ computations carried out above, or whether one or two values appear, or whether three values appear. The instructions are then issued as follows: If no value appears, then into the next stage of computations no values are carried for any $I_{nx}$ or $I_{ny}$ or $I_{nz}$. If a single value for $I_{1x}$ or $I_{1y}$ or $I_{1z}$, or $I_{2x}$, $I_{2y}$ or $I_{2z}$ or $I_{3x}$ or $I_{3y}$ or $I_{3z}$ or $I_{4x}$ or $I_{4y}$ or $I_{4z}$, or if two values appear for $I_{nx}$ or $I_{ny}$ or $I_{nz}$, there will be entered into the appropriate missing location by the device of arithmetical averaging of the adjacent O and MI, or MI and M, or M bnd MT, of MT and O values, a calculated substitute appropriate $I$ value.

There is next defined the input values for the determination of the sequence of planar and spatial vectors which will eventually be generated by this program. These are defined as the algebraic magnitudes of the P waves, of the calculated $I_1$, MI, $I_2$ M, $I_3$, MT, and $I_4$ values; the absolute value of the observed J and the observed T respectively for each of the three coordinate axes thereby yielding a sub-subscript of $x$, $y$ and $z$ respectively. There is also presented a method for producing in addition to these values, the ventricular gradient which is the sum of the algebraic values of M and T and this particular quantity is defined as $VG_x$, $y$, and $z$ and is included as other values to be computed as the termination of the computational grid. This ventricular gradient is expressed as $VG_{x,\ y,}$ and $_z$ and should be carefully distinguished from an essentially similar terminology, but one which has totally different meanings and that is $V_G$ which is defined as the general term for the vector calculations.

21. For each set of terms of the following grid, let the general term be $G_{x,\ y,}$ or $_z$.
$P_x, I_{1x}, MI_x, I_{2x}, M_x, I_{3x}, MT_x, I_{4x}, J_x, T_x$
$P_y, I_{1y}, MI_y, I_{2y}, M_y, I_{3y}, MT_y, I_{4y}, J_y, T_y$
$P_z, I_{1z}, MI_z, I_{2z}, M_z, I_{3z}, MT_z, I_{4z}, J_z, T_z$
Produce $VG_x$ and $_z$ by $(M+T)_{x,\ y,}$ and $_z$ respectively to produce $VG_x$, $VG_y$ and $VG_z$ at termination of grid.

The general calculation of the planar vector for the frontal plane follows the Pythagorean method and is calculated as the square root of the sum of the squares of the general scalar quantities on the $x$ and $y$ axis. The general vector for the sagittal plane is defined as the square root of the sum of the squares of the general scalar quantities of the $z$ and $y$ axes. The general planar vector of the horizontal plane is defined as the square root of the sum of the squares of the $x$ and $z$ scalar values. The general vector in the spatial or the three dimensional area is defined as the square root of the sum of the squares of the scalar quantities of the $x$, $y$and $z$ axes.

There is next calculated in addition to the vector magnitudes in the step immediately above the phase angle of each vector quantity. These are calculated according to the electrocardiographic convention rather than according to normal trigonometric convention. The method of calculation, however, remains a standard trigonometric tangent, arc tangent relationship and the simple definition of the planar vector angle of the frontal plane being equivalent to the spherical trigonometric elevation and the horizontal planar vector phase angle being equivalent to the azimuth represents conventional conversion to spherical trigonometric terms.

The differences in the conventions of the two fields are as follows. Trigonometric convention begins with the upright vertical (ordinate) axis and proceeds clockwise to 90° for the first abscissa, 180° for the return to the ordinate, 270° for the second or leftward facing $x$ axis, and finally returns to 360° at the origin. Electrocardiographic convention on the other hand, begins at the right-ward facing horizontal or abscissa axis and then proceeds clockwise through the downward facing or $-y$ ordinate and ends at the leftward facing horizontal or abscissa axis at 180° and/or immediate conversion at that point to −180° in passing an infintessimally small amount further clockwise is assumed. From that point onward clockwise rotation is assumed to produce an additive effect to the negative angle value thereby yielding −90° at the upright pointing vertical axis and a final return to 0° at the right-ward pointing horizontal axis. This divides the electrocardiographic circle into a positive and negative section, the positive section being defined as that below the $x$ axis, and the negative section being defined as that above the $x$ axis with all motions clockwise being counted as additive and all motions counterclockwise being counted as subtractive. The definitions of arc tangent conversion in the program accomodate to the electrocardiographic conventions.

22. Calculate $\theta_{G_F}$ as follows
a. if $G_x$ and $G_y$ are both positive $$\theta = \text{arc tan}\ \frac{G_y}{G_x}$$

b. if $G_x$ is negative and $G_y$ is postive $$\theta = 180° - \text{arc tan}\ \frac{G_y}{-G_x}$$

c. if $G_x$ is positive and $G_y$ is negative $$\theta = -\text{arc tan}\ \frac{-G_y}{G_x}, \text{ and}$$

d. if $G_x$ and $G_y$ are both negative $$\theta = - \quad 180° - \text{arc tan}\ \frac{-G_y}{-G_x}$$

23. Calculate $\theta_{GS}$ as in step (21) substituting in all cases $G_z$ for $G_x$.
24. Calculate $\theta_{GH}$ as in step (21) substituting $G_z$ for $G_y$ $$\text{and in step } (21-c)\theta_{GH} = 360° - \text{arc tan}\ \frac{-G_z}{G_x}$$

$$\text{and in step } (21-d)\theta_{GH} = 180° + \text{arc tan}\ \frac{-G_z}{-G_x}.$$

The aforementioned simple transfer of the horizontal plane vector angles to the general azimuth in spatial relationships and the frontal plane vector angles to the elevation in spatial relationships is carried out.

25. $V_{sp} = (V_F^2 + V_H^2)^{1/2}$
26. Transfer all values of $\theta_{GH}$ to azimuth $G_{SP}$ and all values of $\theta_{GF}$ to elevation $G_{SP}$.

Next, there is examined the vector loops created by the successive plotting of $I_1$, MI, $I_2$, M, $I_3$, MT, $I_4$ for the maximal spatial deviation between any two points. This is done by a series for first direct comparisons of the major values and then differences of same.

27. Examine for maximum value the sums
    a. $(I_{3x} - I_{1x})^2 + (I_{3y} - I_{1y})^2 + (I_{3z} - bI_{1z})^2$
    b. $(M_x - I_{1x})^2 + (M_y - I_{1y})^2 + (M_z - I_{1z})^2$
    c. $(I_{2x} - I_{1z})^2 + (I_{2y} - I_{1y})^2 + (I_{2z} - I_{1z})^2$ Examination of the maximal differences in these points then leads via Pythagorean methods and trigonometry, to the determination of the magnitude of the vector of maximum distance engendered in a given plane by the movement of the three dimensional spatial vector curve. Similarly, comparisons are made in each plane, the frontal, the sagittal, and the horizontal respectively, and finally in three dimensional space.

These values are essentially equivalent to the greatest Eigenvector for each plane and then by summation the greatest Eigenvector in the spatial relationship.

28. Label the N values of the sum giving the maximum to be designated as $n_1$ and $N_2$ respectively and as $(n_{1x} - n_{2x})$, $n_{1y} - n_{2y})$, and $(n_{1z} - n_{2z}) =$ coordinates xyz of a, then calculate $$V_{aF} = [(n_{1x} - n_{2x})^2 + (n_{1y} - n_{2y})^2]^{1/2}$$

$$\text{and } \theta_{aF} = \text{arc tan}\frac{(n_{1y} - n_{2y})}{(n_{1x} - n_{2x})}$$

with quadrant values as in Step (21) above.
And $$V_{aS} = [(n_{1z} - n_{2z})^2 + (n_{1y} - n_{2y})^2]^{1/2}$$

and $$\theta_{aS} = \text{arc tan}\frac{n_{1y} - n_{2y}}{n_{1z} - n_{2z}}$$

with quadrant values as in Step (21) above.
And $$V_{aH} = [(n_{1x} - n_{2x})^2 + (n_{1z} - n_{2z})^2]^{1/2}$$

and $$\theta_{aH} = \text{arc tan}\frac{(n_{1x} - n_{2x})}{(n_{1z} - n_{2z})}$$

with quadrant values as in Step (23) above.

$$V_{as_p} = [(n_{1x} - n_{2x})^2 + (n_{1y} - n_{2y})^2 + (n_{1z} - n_{2z})^2]^{1/2}$$

and $$\theta_{aF} = \text{elevation and } \theta_{aH} = \text{azimuth}$$

Next is calculated the shortest distance between points on the curve which is in general defined as the relationship obtained by subtraction between Mi and MT and the vector angles of said shortest distance. The frontal, horizontal, and sagittal planes are each calculated for this shortest distance and the largest of the three and the smallest of the three are assigned values as uncorrected Eigenvectors B and C, respectively.

29. Calculate $V_{bF}$ as $[(MI_x = MT_x)^2 + (MI_y - MT_y)^2]^{1/2}$ $$\text{and } \theta_{bF} \text{ as arc tan}\ \frac{(MI_y - MT_y)}{(MI_x - MI_y)}$$

following quadrant rules as in Step (21) above.
Calculate $V_{bS}$ as $[(MI_z - MT_z)^2 + (MI_y - MT_y)^2]^{1/2}$ $$\text{and } \theta_{bF} \text{ as arc tan}\ \frac{(MI_y - MT_y)}{(MI_x - MT_y)}$$

following quadrant rules as in Step (21) above.
Calculate $V_{bH}$ as $[(MI_x - MT_x)^2 + (MI_z - MT_z)^2]^{1/2}$ $$\text{and } \theta_{bH} \text{ as arc tan}\ \frac{(MI_z - MT_z)}{(MI_x - MT_x)}$$

following quadrant rules as in Step (23) above.

By reference to the angles of Eigenvector A, the major determining value, a correction for non perpendicularity of uncorrected Eigenvectors B and C is made. This correction is a simple sine function and yields Eigenvector B (corrected) and Eigenvector C (corrected) in the frontal, sagittal, and horizontal planes. Commparison as to which of the two potential values in each plane and in three dimensional space is indeed the largest yields a final determination as to which receives the designation of Eigenvector B and Eigenvector C, the general relationship that Eigenvector B is larger than Eigenvector C being held.

30. Determine the acute angles of intersection between $\theta_{aF}$ and $\theta_{bF}$, $\theta_{aS}$ and $\theta_{bS}$, and $\theta_{aH}$ and $\theta_{bH}$. Label as $_F$, $_S$, and $_H$.

Then $V_{bF} \cdot \sin \alpha_F = V_{bF}$ cor.
$V_{bS} \cdot \sin \alpha_S = V_{bS}$ cor.
$V_{bH} \cdot \sin \alpha_H = V_{bH}$ cor.

Calculate $V_{a_F} / V_{b_F\,cor.}$, $V_{a_S} / V_{b_S\,cor.}$, and $V_{a_H} / V_{b_H\,cor.}$ The magnitude and phase angle of the planar Eigenvector A having been determined above, at this point a solid $E_A$ is found by the usual $A^2 + B^2 + C^2 = D^2$ pythagorean equation, and $\phi E_A$ and $\phi E_A$ are designated as elevation and azimuth values in accordance with the conventions stated above.

31. Calculate $E_A = (n_{1_x} - n_{2_x})^2 + (n_{1_y} - n_{2_y})^2 + (n_{1_z} - n_{2_z})^2 \quad ^{1/2}$ and Azimuth $E_A = \theta_{aH}$ and Elevation $E_A = \theta_{aF}$ Determination of the magnitude relationships of $E_B$ and $E_C$ permits deisgnation of the smaller as the polar vector. This is by definition the smaller of the two lesser Eigenvectors and lies in three dimensional space at right angles to both other Eigenvectors. Its magnitude has already been determined and its azimuth and elevation are then specifiable by reference to the similar values detemined for Eigenvector A above.

32. Examine $V_{6_F}$ cor. and $V_{6_H}$ cor.

If $V_{6F}$ cor. $<$ $V_{6H}$ cor.

then $V_{6F}$ Cor. $= E_C$, $V_{6H}$ cor. $= E_B$ and $Az_{PV} = \theta_{a_H}\ El_{PV} = \theta_{a_F} - 90°$ If $V_{6_H}$ cor. $<$ $V_{6_F}$ cor.

then $V_{6_H}$ cor. $= E_C\ V_{6_F} = E_B$ and $Az_{PV} = \theta_{a_H} - 90°, El_{PV} = u_{aF}$ The quantity magnitude of ventricular gradient in the three planes and in three dimensional space has already been calculated under the general vector program above and the azimuth and elevation of the spatial M vector and the azimuth and elevation of the spatial T vector have been calculated under their appropriate steps also. A calculation of solid angle difference between these angles is then made by solid trigonometric methods and the spatial ventricular gradient solid angle value in addition to the three planar ventricular gradient angle differencs is added to the data.

33. Determine angle difference M-T $(\theta_{M_F} - u_{T_F})$, $(\theta_{M_S} - \theta_{T_S})$ and $(\theta_{M_H} - \theta_{T_H})$ and record.

Determine value $(\theta_{M_{s_p}} - u_{T_{sp}})$ as $=$ arc hausin. [hausin. $(\theta_{M_F} - u_{M_T} +$ hausin. $(\theta_{M_H} - \theta_{M_T})$]

The calculated discriminate values for each of the planar vector magnitudes and phase angles and spatial vector magnitudes, azimuths, elevations and angle differences as appropriate are entered into an output table, or are used to construct a three dimensional spatial model or are retained in a computer memory depending upon the next area of use.

The description of the quantities in a simple output printing grid is of limited utility and basically of academic interest only.

It is possible, using this method, to construct a wire model three dimensional vector loop, a rectangular parallelapiped structure enclosing that vector loop, having its three sides terminating in a single three dimensional right angle relationship, the three Eigenvectors A, B, and C and to construct a solid body having its origin at the center of a sphere extending to the surface of one shpere in the case of the M vector and extending to the surface of still another larger or smaller sphere in the case of the T vector with a determination of the straight line or curvilinear line connecting the two located data points on the surface of the two spheres and a solid angle between.

It is also possible to use these models in visual comparison with a set of models representative of the normal ECG and representative of the ECG in various clinical states of abnormal myocardial function. Such a visual comparison would be an aid to the diagnosis. It would be possible to measure the differences between the models derived from any input ECG and a succession of models as described above. From this, one might derive a pattern of the degree of similarity or dissimilarity between the calculated model and the models of the already diagnosed disease conditions.

The third and principal area of usefullness is to describe the essential construction parameters for such a model without resorting to the actual construction and then to compare by a multi-variant regression analysis all of the input features with all of the features of the normal electrocardiogram as calcualted similarly over a large series with appended standard deviations of each value and also all of the parameters of the multiplicity of clinical diagnoses. In this fashion, entirely analogous to the model as described above, it is possible to arrive at an estimate of the probability of any one input tracing resembling any one or more of the prototype tracing characteristics stored in the machine's memory. It is in fact a more accurate and probably diagnostically more meaningful procedure to function in this manner than the making of the mechanical model but both processes are entirely analogous and both represent innovations in the art, being possible from a normal electrocardiographic tracing only and for the first time by this method. FIG. 4 illustrates in a pure diagrammatic form a typical system including all the requisite means for practicing the invention. There is shown in a partial illustrative subject 20 upon whom the cardiographic analysis is to be performed. There are shown a plurality of electrical leads 21, 22, 23, and 24 secured to the subject 20 body. It should be noted that the position and number of leads are shown in locations that are only exemplary of the many possible locations on a subject's body. Those points shown are not intended to be limitative of the invention and are for purpose of ease of illustration only. These leads 21, 22, 23, and 24 are shown as a single lead 26 entering an electrocardiograph 27. The electrocardiograph 27 provides a plurality of sets of deflections, each set representative of a single cardiac cycle of the subject 20 which appear on tracing 28. From tracing 28 a technician measures and records deflection values and temporal values for a selected number of sets.

The data thus reduced to the forms shown in FIGS. 2 and 3 is transferred to the digital computer 30 as shown by flow line 29. It is to be understood that the digital computer and its related memory are conventional and as such provide a readily available apparatus for performing the computer operations necessary to practice the method of this invention. Within the conventional digital computer there are provided stored programs and circuits for constructng three dimensional model parameters of the subjects' 20 cardiac cycle, and constructing a model of the subject's 20 cardiac rhythm and conduction. In addition the computer readily allows for the comparing of the aforementioned parameter and model values to similar values for previously determined and stored normal and abnormal cardiac conditions and for determining from said comparisons the existance of cardiac abnormalities.

There is shown a conventional print out unit 32 connected by arrow 31 which print out unit 32 provides for each subject an alphabetic-decimal report of the presence of specific cardiac abnormalities.

This invention provides a reliable, rapid and inexpensive means for obtaining interpretations and diagnoses of ECGs which permits widespread use by virtually all hospitals and practitioners, wherever geographically situated, of computerized interpretation of ECGs and diagnoses therefrom. The method of this invention reduces substantially the amount of input data needed for the computer interpretation and diagnosis of ECGs and provides a reliable and consistent means of analyzing ECGs which obviates the possibility of variation and error in the human interpretation of such data.

According to the provisions of the patent statutes, the principle, preferred construction and mode of operation of the invention have been explained and what are considered the best embodiments have been illustrated and described. However, it should be understood that, with the scope of the appended claims, the invention may be practiced otherwise than as specifically illustrated and described.

I claim:

1. A method for determining the existence, nature and degree of cardiac abnormalities in a subject comprising, obtaining from the subject a plurality of electrocardiographic tracings, each of which tracings comprises a plurality of sets of deflections with each such set representative of one cardiac cycle of the subject, measuring and recording from said tracing the values for each deflection in a selected number of sets, constructing from said deflection values a plurality of parameters defining a three dimensional model of the subject's cardiac cycle, constructing a three dimensional model of the cardiac cycle of said subject from said plurality of parameters constructed from said deflection values, constructing from said deflection values a model expressing the inter and intra deflection occurrence times thereby defining the subject's cardiac rhythm and conduction, comparing the values of said parameters and said three dimensional cardiac cycle model for said subject to the values of previously determined similar parameters and three dimensional cardiac cycle models for normal and abnormal cardiac conditions, determining from said comparison the existence in the subject of various types of cardiac abnormalities.

2. A method as described in claim 1 comprising measuring and recording the deflection values for only three orthogonal leads of the electrocardiographic tracings.

3. A method as described in claim 2 comprising measuring and recording deflection values for lead I, lead $aV_f$ and one of leads $V_1$ and $V_2$.

4. A method as described in claim 1 comprising measuring and recording the deflection values for at least six sets of deflections.

5. A method as described in claim 1 comprising submitting the deflection values to computer means, constructing in said computer means parameters defining the three dimensional model of the subject's cardiac cycle, comparing in said computer means the constructed parameters with previously determined similar parameters for normal and abnormal cardiac conditions, and determining in said computer means the existance in the subject of various types of cardiac abnormalities.

6. A method as described in claim 5 comprising storing in said computer means standardized three dimensional parameters of the cardiac cycle for normal and abnormal conditions, and producing from the computer means for each subject an alphabetic-decimal report of the presence of specific cardiac abnormalities in the subject.

7. A method as described in claim 1 wherein the step of constructing from said deflection values a plurality of parameters defining a three dimensional model of the subject's cardiac cycle comprises constructing from said deflection values a plurality of two dimensional parameters descriptive of the myocardial action potential accompanying the cardiac contractions of the subject, and then constructing from said two dimensional parameters the plurality of parameters defining the three dimensional model.

8. A method as described in claim 1 wherein, said plurality of parameters defining a three dimensional model comprises a spatial vector magnitude, an azimuthal angle related to said vector magnitude, and angle of right ascension related to said vector magnitude, a ventricular gradient, and a set of Eigenvectors related to the shape, size and position of the three dimensnional vector loop.

9. A method as described in claim 1 comprising, measuring and recording temporal values on the sets of deflection at preselected points of each deflection, comparing individual temporal values for similar points between sets and for dissimilar points within a set, and determining from said comparison the existance, the nature and degree of possible rhythm abnormalities in the subject's cardiac cycle.

10. A method as described in claim 9 comprising combining the results of the comparison of temporal values with the results of the comparison of the parameters of the three dimensional model to determine the existance, nature and degree of specific cardiac abnormalities in the subject.

* * * * *